UNITED STATES PATENT OFFICE.

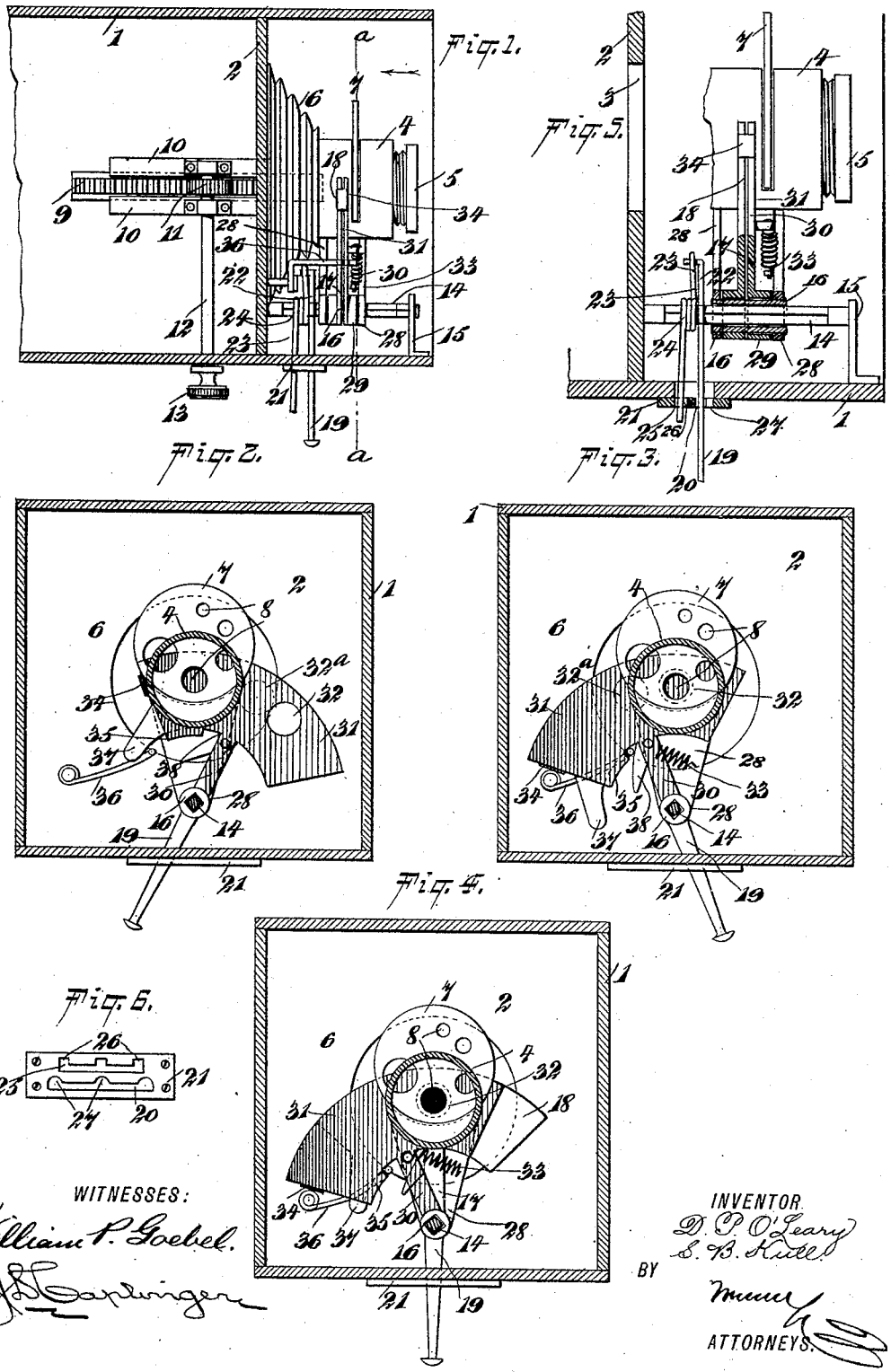

DANIEL P. O'LEARY AND SAMUEL B. KULL, OF NEW YORK, N. Y.

PHOTOGRAPHIC SHUTTER.

SPECIFICATION forming part of Letters Patent No. 574,756, dated January 5, 1897.

Application filed February 11, 1896. Serial No. 578,936. (No model.)

*To all whom it may concern:*

Be it known that we, DANIEL P. O'LEARY and SAMUEL B. KULL, of New York city, in the county and State of New York, have invented a new and Improved Photographic Shutter, of which the following is a full, clear, and exact description.

This invention relates to certain improvements in shutters such as are employed in connection with photographic cameras for controlling the exposure of the sensitive film; and the object of the invention is to provide a device of this character, of a simple and inexpensive nature, which shall be strong and durable in construction and shall be capable of being readily and conveniently manipulated to secure either an instantaneous or time exposure.

The invention consists in a photographic shutter comprising two shutter plates or slides arranged to secure the lens and having apertures normally out of coincidence, one of said plates or slides being adapted for movement independent of the other plate or slide to bring said apertures in line for the passage of light through the lens, a catch to hold the other plate or slide with its aperture in line with the lens, and means to disengage the catch, so that the plate held by it is released, said means being actuated by the return movement of the first-named plate.

The invention also contemplates certain novel features of the construction, combination, and arrangement of the parts of the improved photographic shutter, whereby certain important advantages are attained and the device is made simpler, cheaper, and otherwise better adapted and more convenient for use than various other forms of shutter heretofore employed, all as will be hereinafter fully set forth. The novel features of the invention will be carefully defined in the claims.

Reference is to be had to the accompanying drawings, forming a part of this specification, in which similar characters of reference indicate corresponding parts in all the views.

Figure 1 is a fragmentary vertical section taken longitudinally through the forward part of a camera and showing our improved shutter applied thereto for use. Fig. 2 is a section taken at right angles to Fig. 1 in the plane indicated by the line *a a* in said figure and showing the shutter in its closed position. Fig. 3 is a sectional view similar to Fig. 2, but showing the shutter set ready for use. Fig. 4 is a sectional view similar to Figs. 2 and 3, but showing the shutter-slide in position to permit the passage of light through the lens. Fig. 5 is a fragmentary sectional view somewhat similar to Fig. 1, but drawn to an enlarged scale and showing in section the bearings of the shutter plates or slides; and Fig. 6 is a detached view showing the locking-plate for holding the shutter slide and spring in adjusted position.

In the views, 1 indicates the body or casing of the camera to which our improved shutter is applied, this being provided in the usual way with a partition 2, perforated, as indicated at 3, for the passage of light from the lens-tube 4, wherein is contained the lens in the ordinary way. The lens-tube is provided with a glass 5, of a well-known construction, and its rear end is connected by a leather 6 to the diaphragm or partition 2, so that the lens-tube may be moved in focusing.

In the lens-tube is mounted an eccentric disk or plate 7, having a series of apertures 8 formed in it and of graduated dimensions, so that the amount of light passing through the lens may be conveniently regulated; and in order to move the lens-tube 4 in focusing said tube is connected with a rack-bar 9, as indicated in Fig. 1, said rack-bar extending along the casing 1 of the camera and being guided in strips 10, secured to the casing. The teeth of the rack-bar 9 are arranged to be engaged by a pinion 11, held on a shaft or stem 12, mounted to turn in the casing and having one end projecting therefrom and provided with a thumb-nut or head 13, as clearly indicated in the drawings.

On the casing 1, beneath the lens-tube 4, is mounted a shaft 14, one end of which is journaled in the diaphragm or partition 2 and the opposite end of which is journaled in a bracket or bearing-piece 15 on the casing 1. The shaft 14 is squared, as clearly seen, for a portion of its length, and on it is arranged to slide longitudinally a sleeve 16, having a squared central opening, on which sleeve is fixed an arm 17, projecting radially from the sleeve and carrying at its extremity one of the shutter plates or slides 18, arranged to play in an opening formed in the lens-tube 4. The shaft 14 has fixed to it an operating arm or handle 19, which projects through an opening formed in the lower part of the casing 1 and extends through a slot 20 in the face-plate 21, secured in the casing over said opening, the projecting end of said arm or handle forming a convenient means for operating the shutter, as will be hereinafter described.

The arm or handle 19 is made to project at its opposite end beyond the shaft 14, as indicated at 22 in the drawings, and on said projecting end 22 is formed a pin or lug with which is engaged the upper end of a spring 23, coiled upon the shaft 14, as indicated at 24, and having its opposite end arranged to extend through a slot 25, formed in the face-plate 21 and extending parallel to the slot 20 above mentioned. The slot 25 is provided at its ends and at its center with recesses 26, extending from it and forming seats to receive the projecting end of the spring 22, whereby it will be seen that the tension of the same may be conveniently adjusted, so as to give a slow or quick exposure. The slot 20 in the face-plate 21 is similarly provided with three seats or recesses 27 to receive the handle or arm 19, and said recesses 27 serve to hold said handle against movement, as will be hereinafter explained.

The sleeve 16 is supported at its ends in arms 28, extending from the lens-tube 4, whereby it will be seen that as the lens-tube is adjusted forward or back by turning the thumb-nut 13 in focusing the camera the sleeve 16 will also be caused to play along the shaft 14, and on said sleeve, between the arms 28 and adjacent to the arm 17, is mounted to turn a collar 29, having an arm 30 projecting from it and carrying the other shutter plate or slide 31, arranged to pass through an opening formed in the lens-tube 4, adjacent to the opening in which the slide or plate 18 plays.

The shutter plates or slides 18 and 31 are of similar dimensions, being segmental in form, and the plate or slide 31 is provided with an aperture 32, formed in it, while the plate or slide 18 is provided with an aperture 32$^a$, of a diameter corresponding to that of the aperture 32, and these apertures 32 and 32$^a$ in the plates or slides are adapted to correspond, when said plates are moved back and forth, with the opening 8 in the disk 7, which is then in line of the lens. The openings 32 and 32$^a$ are normally out of alinement, as shown in Figs. 2 and 3.

On one end of the slide or plate 31 is formed an integral lug or projection 34, arranged to be engaged by the end of the plate or slide 18, whereby it will be seen that when the handle 19 is moved in one direction the slides or plates 18 and 31 will be caused to move in unison, and in order to hold said lug in engagement with the end of the plate 18 at all times and to retract the slide or plate 31 when released said plate is provided with a spring 33, connected to one of the arms 28, which support the sleeve 16. On the plate or slide 31 is formed a lug or projection 35, adapted to be engaged by the bent end of a spring-dog 36 when the plates or slides are moved by the operation of the handle 19, whereby it will be seen that the plate 31 will be engaged by said spring-dog when moved in one direction and will be held until released with its opening 32 alined with the opening 8 in the disk 7.

To release the slide or plate 31, the plate 18 is provided with a cam 37, arranged, when the said plate 18 moves in the opposite direction, to engage the bent end of the spring-dog 36 and push the same out of engagement with the lug 35, and in order to insure the proper engagement of said dog 36 with the lug 35 on the slide or plate 31 we prefer to provide the plate 18 with a cam or projection 38, arranged to engage the bent end of the dog 36, when the two plates 18 and 31 are moved by the operation of the handle 19, and push said dog into engagement with the lug, as will be understood by inspection of Fig. 3.

In operation the focus will first be secured by turning the thumb-nut, whereby the lens-tube 4 will be caused to move longitudinally, carrying with it the sleeve 16, which slides upon the squared shaft 14, and when the focusing has been accomplished and it is desired to make an exposure the handle or arm 19 is moved in one direction, to the right, as seen in Fig. 2, so as to move the slides or plates 18 and 31 in the opposite direction to the positions indicated in Fig. 3, the opening 32 in the plate 31 being then alined with the opening 8 in the eccentric disk 7. When in this position, the arm or handle 19 may be inserted in one of the notches 27 in the face-plate 21, and the said device will then be held set for use. When it is desired to make the exposure, the arm or handle 19 will be pushed from the notch or recess 27 with which it is engaged, and the spring 23, which was placed under tension by the movement of said handle, as above described, will react and force said handle in the opposite direction, turning the shaft 14, to which the handle is secured, and likewise turning the said sleeve 16 on said shaft. The arm 17, being fixed to the sleeve 16, will likewise be swung so as to cause the slide or plate 18 to move in the opposite direction, as will be readily understood.

When the arm or handle 19 is moved to the right, as above described, the cam or lug 38 upon the slide or plate 18 will act to force the dog 36 into engagement with the lug 35 on the slide 31, whereby said slide 31 will be held in position against the tension of its spring 33 and with its opening 32 alined with the opening 8 in the disk 7, and consequently when the plate 18 moves back upon the releasing of the handle 19 the opening 32$^a$ therein will be moved past the opening 32, so as to secure an instantaneous exposure of the plate within the camera. When the slide or plate 18 has reached the end of its backward movement, the cam 37 thereon will engage the dog 36 and throw the same out of engagement with the lug 35, whereby the plate or slide 31 will be freed, and said plate 31 will thereupon move back by means of its spring 33 until its stop 34 again engages the end of the other shutter-plate 18.

To secure a time exposure, the handle 19 will be moved as above described, but instead of being permitted to move entirely back under the influence of its spring 23 said handle will be engaged with the center notch or recess 27 in the face-plate 21, so that the openings 8, 32, and 32$^a$ will be held in alinement. When a sufficient time has elapsed, the handle or arm 19 will be pushed out of engagement with the notch 27 wherein it rests, so that the slides or plates 18 and 31 may be moved to shut off the light from the sensitive plate.

From the above description of the invention it will be seen that the shutter is of an extremely simple and inexpensive nature and is especially well adapted for the purposes for which it is designed, as it requires for its operation but one movement of the handle 19, said handle being returned automatically by means of its spring 23. The shutter is moreover adapted to be readily changed from an instantaneous to a time shutter by merely engaging the handle or arm 19 in the central notch 37, as above described. It will also be obvious from the above description that the invention is susceptible of some modification without material departure from its principles and spirit, and for this reason we do not wish to limit ourselves to the exact form of the parts herein set forth.

Having thus described our invention, we claim as new and desire to secure by Letters Patent—

1. A camera-shutter, comprising two plates or slides having openings normally out of coincidence, means for moving the plates in one direction, a dog arranged to engage one of the plates and hold the same when moved, means to retract the other plate, said openings being arranged to be brought into coincidence by the movement of the last-mentioned plate, and a releasing device carried by said last-mentioned plate and arranged when the same is retracted to engage the dog and move the same out of engagement with the other plate, substantially as set forth.

2. A photograph-shutter, comprising two plates or slides having apertures normally out of coincidence, a handle connected to one of the plates and arranged to move the same, a lug on the other plate arranged to engage the plate with which the handle is connected, to move both plates in one direction in unison, means for retracting the respective plates, a dog to hold the plate whereon the lug is mounted when moved in one direction, and a releasing device carried by the other plate, to disengage said dog, substantially as set forth.

3. A photograph-shutter, comprising two plates provided with apertures normally out of coincidence, a shaft having a handle and connected to one of the plates to move the same, the other plate being movable independently of said shaft and having a lug to engage the plate with which the shaft is connected, to move both plates in one direction in unison, means for retracting the respective plates, a dog arranged to engage the plate having the lug to hold the same in position when moved, and a releasing device carried by the other plate arranged to disengage the dog from the plate, substantially as set forth.

4. The combination of a casing, a lens-tube longitudinally movable therein, means for moving the lens-tube, a shaft, a sleeve arranged to turn with the shaft and adapted to move longitudinally thereon, a handle for operating the shaft, a shutter-plate connected to the sleeve and having an aperture, another shutter-plate mounted to turn on the sleeve and also provided with apertures, said apertures being normally out of coincidence, a lug on one plate to engage the other to move both plates in unison in one direction, means for retracting the plates, a dog arranged to engage one plate and hold the same when moved, and a releasing device actuated by the backward movement of the other plate, to disengage the said dog, substantially as set forth.

5. A photographic shutter, comprising two plates or slides having apertures normally out of coincidence with the lens, means to move one plate to bring its aperture into coincidence with the lens, means to hold said plate with its aperture in coincidence with the lens, means to move the other plate to cause its aperture to pass across the lens, and means actuated by the last-mentioned plate to release the first-mentioned plate, substantially as set forth.

6. A photographic shutter, comprising two plates or slides having apertures normally out of coincidence with the lens, a handle connected to one plate and arranged to move the plates in one direction, means to hold one plate when moved by the handle, with its aperture coinciding with the lens, and a spring to move the other plate to cause its aperture to pass across the lens, said last-mentioned plate when moved by its spring being arranged to release the first-mentioned plate to bring its aperture out of coincidence with the lens, substantially as set forth.

7. A photographic shutter, comprising two plates or slides having means for moving them and provided with apertures normally out of coincidence with the lens, one plate having a catch to hold it against movement when its aperture coincides with the lens, and a releasing device actuated by the other plate when moved to cause its aperture to pass across the lens, said releasing device being arranged to disengage the catch from the first-mentioned plate, substantially as set forth.

8. The combination of a casing having a lens-tube, a shaft arranged to turn in the casing, a handle for operating the shaft, a shutter-plate carried on and moving with the shaft and having an aperture, another shutter-plate arranged to turn pivotally on the shaft and also provided with an aperture, said apertures being normally out of coincidence with the lens, a catch to hold one of the plates against movement when its aperture coincides with the lens, means for moving the plates in one direction in unison with the handle, means for retracting the plates to cause their apertures to pass into coincidence with each other and with the lens, and a releasing device to disengage the catch when the handle is retracted, substantially as set forth.

9. The combination of a casing having an opening, a slotted face-plate arranged at the opening and having recesses leading into its slot, and a shutter-slide operatively mounted in the casing and having a handle arranged to play in the slot in the face-plate and adapted to be engaged with the recesses leading into the same, said shutter-slide being arranged for instantaneous and time exposure, and being controlled in its operation by the engagement of the handle with the various recesses in the face-plate, substantially as set forth.

10. The combination of a casing having a lens-tube, an operating-handle, a face-plate having recesses with which the handle is adapted to engage, whereby the handle may be held in various positions, a shutter-plate moving with the handle and having an aperture, another shutter-plate arranged to turn pivotally and also provided with an aperture, said apertures being normally out of coincidence with the lens, one of the plates being arranged to move in one direction in unison with the handle, a catch to hold the pivotally-mounted plate when the plate is moved to bring its aperture in coincidence with the lens, means to retract the other plate to bring its opening into coincidence with the lens, and a releasing device actuated by said plate to disengage said catch, substantially as set forth.

11. In a camera, the combination of a casing, a lens-tube mounted therein and arranged to be moved to focus the camera, a sleeve carried by the lens-tube, shutter slides or plates carried on the lens-tube and actuated from said sleeve, a handle mounted in the casing, and a shaft connected to the handle and having a sliding engagement with said sleeve to move the same to actuate the shutter plates or slides, substantially as set forth.

12. In a camera, the combination of a casing, a lens-tube mounted therein and arranged to be moved to focus the camera, a sleeve carried by the lens-tube, shutter plates or slides carried on the lens-tube and actuated from said sleeve, a shaft having engagement with the sleeve to move the same to actuate said plates or slides, and an operating-handle carried by the casing and also connected with the shaft to turn the same, substantially as set forth.

13. In a camera, the combination of a casing, a face-plate mounted thereon and provided with a slot and having recesses communicating with said slot, a lens-tube mounted in the casing, shutter plates or slides, a shaft to actuate the plates or slides, a handle for operating the shaft and extending through the slot in the face-plate, and a spring coiled on the shaft and arranged to retract the handle when the same is released, said spring having one end arranged to be held in either of the recesses in the face-plate, substantially as set forth.

DANIEL P. O'LEARY.
SAMUEL B. KULL.

Witnesses:
A. C. ANDERSON,
HERMAN STIEFEL.